(12) United States Patent
Shibuta et al.

(10) Patent No.: US 9,699,750 B2
(45) Date of Patent: Jul. 4, 2017

(54) SYNCHRONIZATION ESTABLISHMENT METHOD

(71) Applicant: Panasonic Intellectual Property Management Co., Ltd., Osaka (JP)

(72) Inventors: Akira Shibuta, Fukuoka (JP);
Hiroyuki Ishihara, Fukuoka (JP);
Koichi Yamamoto, Fukuoka (JP);
Katsunori Takahashi, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 147 days.

(21) Appl. No.: 14/682,906

(22) Filed: Apr. 9, 2015

(65) Prior Publication Data

US 2015/0304974 A1 Oct. 22, 2015

(30) Foreign Application Priority Data

Apr. 18, 2014 (JP) ................................. 2014-086488

(51) Int. Cl.
*H04J 3/06* (2006.01)
*H04W 56/00* (2009.01)

(52) U.S. Cl.
CPC .............................. *H04W 56/0015* (2013.01)

(58) Field of Classification Search
None
See application file for complete search history.

(56) References Cited

U.S. PATENT DOCUMENTS

| 5,276,703 | A | * | 1/1994 | Budin | H04W 74/02 370/347 |
| 6,567,386 | B1 | * | 5/2003 | Sugaya | H04W 74/06 370/322 |
| 7,190,703 | B1 | | 3/2007 | Heitmann | |
| 2005/0180575 | A1 | * | 8/2005 | Maeda | H04L 9/12 380/278 |
| 2014/0050232 | A1 | * | 2/2014 | Hirose | H04J 3/0667 370/503 |

FOREIGN PATENT DOCUMENTS

JP 2003-509973 A 3/2003
WO 01/20889 A1 3/2001

* cited by examiner

*Primary Examiner* — Kwang B Yao
*Assistant Examiner* — Juvena Loo
(74) *Attorney, Agent, or Firm* — Seed IP Law Group LLP (57) ABSTRACT

Provided is a synchronization establishment method capable of reducing the time required to establish synchronization in a slave station without putting an unnecessary load on a master station. In the synchronization establishment method, a one-second cycle of a message is divided into 100 time slots including slot "0" to slot "99"; ten slots including slot "90" to slot "99" as some of the slots are allocated to a fast synchronization establishment mode; and, in the fast synchronization establishment mode, messages such as Sync2, Delay_Req, and Delay_Resp are transmitted and received between the master station and the slave station so that the slave station establishes synchronization.

14 Claims, 9 Drawing Sheets

SYNCHRONIZATION ESTABLISHMENT METHOD

BACKGROUND OF THE INVENTION

1. Field of the Invention

The present invention relates to a synchronization establishment method which is suitable to be used for a communication system conforming to IEEE 1588 Ver. 2 which is a protocol for performing synchronization between apparatuses via a local network such as Ethernet (registered trademark).

2. Description of the Related Art

The above-described IEEE 1588 Ver. 2 defines that, when synchronization is established between a base station (hereinafter, referred to as a "master station") serving as a master and a base station (hereinafter, referred to as a "slave station") serving as a slave, the master station transmits a message such as "Sync" every second.

IEEE 1588 Ver. 2 also defines an option for establishing synchronization in a short period of time. Sync when this option is used is temporarily referred to as Sync2.

The above-described technique, that is, a technique for establishing synchronization by using a local network is known. For example, Japanese Patent Unexamined Publication (Translation of PCT application) No. 2003-509973 discloses a synchronization method for a plurality of base stations in a mobile communication network. This synchronization method is a synchronization method for a plurality of base stations in a mobile communication network, in which time information is transmitted to the plurality of base stations via a local network (LAN), a clock generator of each base station which receives the time information is adjusted on the basis of a reception time point and time information content of the time information, and transmission of a function sequence related to a wireless time frame to each base station is controlled on the basis of a signal of the clock generator.

However, in IEEE 1588 Ver. 2, in a case where the option for establishing synchronization in a short period of time is used, Delay_Req is also returned in a short cycle in relation to Sync2, and thus there is a problem in that, as the number of slave stations increases, the load on the master station increases, and synchronization cannot be established in a case where the resource capability of the master station is exceeded.

SUMMARY OF THE INVENTION

The present invention has been made in consideration of the above-described circumstances, and an object thereof is to provide a synchronization establishment method capable of reducing time to establish synchronization in a slave station without putting an unnecessary load on a master station.

According to the present invention, there is provided a synchronization establishment method of performing synchronization establishment between a master station and a slave station via a network, the method including dividing a message cycle into a predetermined number of time slots; allocating some of the predetermined number of time slots to a fast synchronization establishment mode; and performing synchronization establishment by transmitting and receiving a predetermined message between the master station and the slave station in the fast synchronization establishment mode, in which, prior to entry into the fast synchronization establishment mode, the slave station transmits a fast synchronization establishment mode request to the master station, and the master station transmits fast synchronization establishment mode permission to the slave station in response to the fast synchronization establishment mode request.

According to the method, a cycle (for example, one second) of a message is divided into a predetermined number of time slots (for example, 100 time slots including slot "0" to slot "99"); some of the slots (for example, ten slots including slot "90" to slot "99") are allocated to a fast synchronization establishment mode; and, in the fast synchronization establishment mode, a predetermined message (for example, Sync2, Delay_Req, and Delay_Resp) is transmitted and received between the master station and the slave station so that the slave station establishes synchronization. Therefore, it is possible to reduce the time required to establish synchronization in the slave station without putting an unnecessary load on the master station.

According to the present invention, it is possible to reduce the time required to establish synchronization in a slave station without putting an unnecessary load on a master station.

DETAILED DESCRIPTION OF THE PREFERRED EMBODIMENT

Hereinafter, a preferred embodiment of the present invention will be described in detail with reference to the drawings.

Exemplary Embodiment

Figure 1:
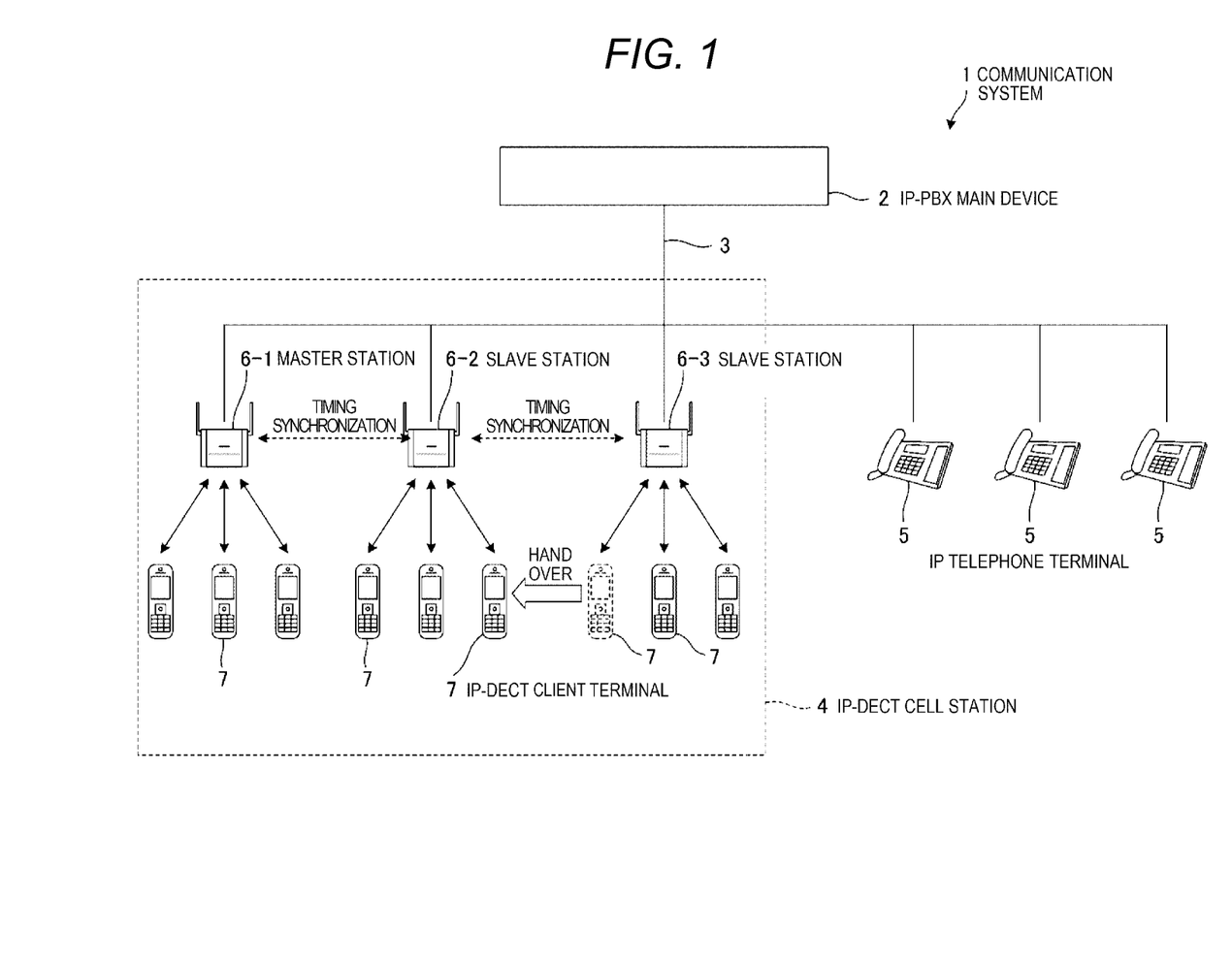
FIG. 1 is a diagram illustrating a schematic configuration of a communication system in an exemplary embodiment of the present invention.

FIG. 1 is a diagram illustrating a schematic configuration of a communication system in an exemplary embodiment of the present invention. In FIG. 1, communication system 1 in the present exemplary embodiment includes IP-PBX main device 2 which is an exchange device; IP-DECT cell station 4 which is connected to IP-PBX main device 2 in a wired manner via Ethernet (registered trademark) 3; and IP telephone terminal 5 which is connected to IP-PBX main device 2 in a wired manner via Ethernet (registered trademark) 3. IP-DECT cell station 4 includes three stations (base stations) 6-1 to 6-3 which enable IP-DECT client terminals 7 to perform wireless communication. Here, IP stands for "Internet Protocol", PBX stands for "Private Brach eXchanges", and DECT stands for "Digital Enhanced Cordless Telecommunications".

Three stations 6-1 to 6-3 are connected to Ethernet (registered trademark) 3, so that communication can be performed with IP-PBX main device 2, and communication can be performed between respective stations 6-1 to 6-3. In the present exemplary embodiment, among three stations 6-1 to 6-3, station 6-1 is set as a master, and the other two stations 6-2 and 6-3 are set as slaves. The setting of a master and a slave for stations 6-1 to 6-3 is performed by IP-PBX main device 2. Hereinafter, station 6-1 will be referred to as master station 6-1, and stations 6-2 and 6-3 will be referred to as slave stations 6-2 and 6-3.

Master station 6-1 and slave stations 6-2 and 6-3 are synchronized with each other via Ethernet (registered trademark) 3 so that IP-DECT client terminal 7 can perform communication with stations 6-1 to 6-3 in a seamless manner (that is, so that handover occurs without interruption of the communication). In the present exemplary embodiment, the number of stations in IP-DECT cell station 4 is three, but there is no limitation to the number thereof However, since slave stations 6-2 and 6-3 are synchronized with master station 6-1, the number of slave stations is limited due to the resource capability (for example, the processing capability of a CPU) of master station 6-1.

Figure 2:
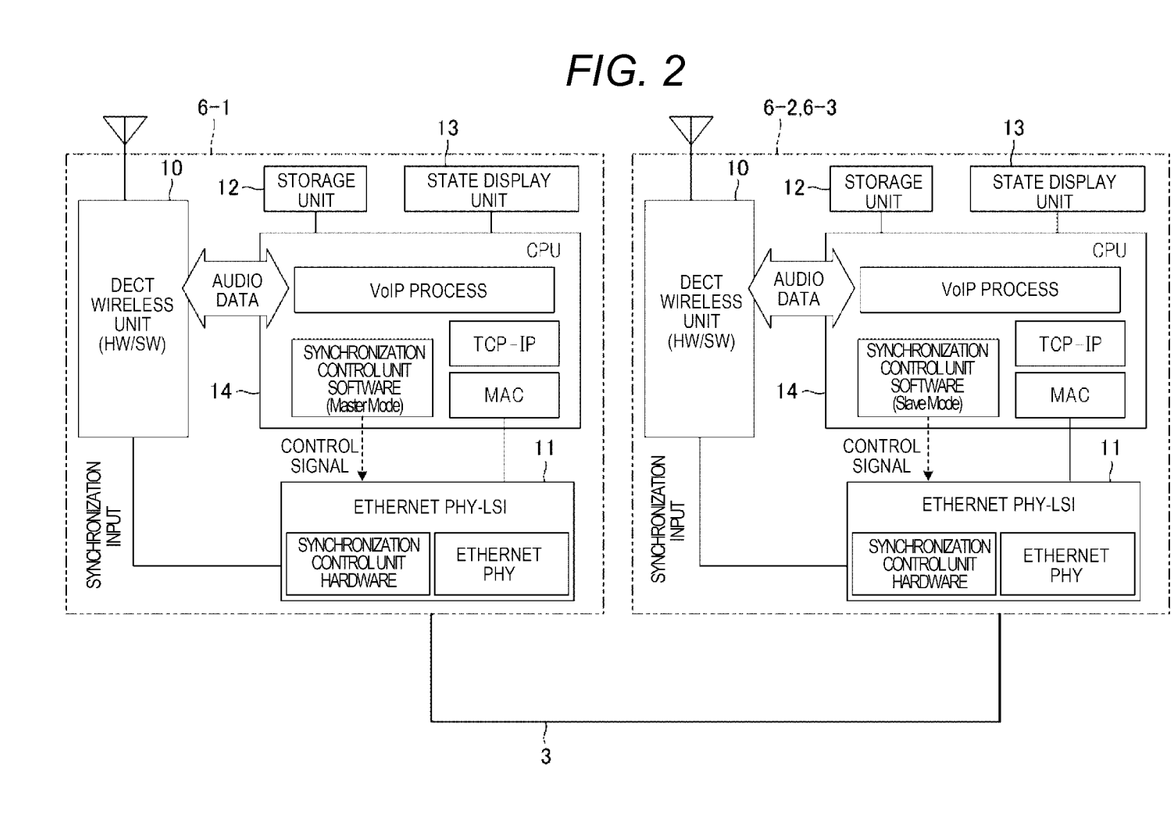
FIG. 2 is a block diagram illustrating a schematic configuration of each of a master station and a slave station of the communication system illustrated in FIG. 1.

FIG. 2 is a block diagram illustrating a schematic diagram of each of master station 6-1 and slave stations 6-2 and 6-3. As illustrated in FIG. 2, master station 6-1 and slave stations 6-2 and 6-3 have the same configuration, and the only difference therebetween is whether the stations are set as a master or a slave in terms of software. As described above, in the present exemplary embodiment, station 6-1 is set as a master, and stations 6-2 and 6-3 are set as slaves. Hereinafter, a configuration thereof will be described by exemplifying master station 6-1.

In FIG. 2, master station 6-1 includes DECT wireless unit 10, Ethernet (registered trademark) physical layer (PHY)-large scale integration (LSI) 11, storage unit 12, state display unit 13, central processing unit (CPU) 14. DECT wireless unit 10 is constituted by hardware (HW) and software (SW) for performing DECT type wireless communication with IP-DECT client terminal 7 illustrated in FIG. 1. Ethernet PHY-LSI 11 has an Ethernet (registered trademark) PHY and synchronization control unit hardware. CPU 14 performs a Voice over Internet Protocol (VoIP) process, and has a transmission control protocol (TCP)-Internet protocol (IP), media access control (MAC), and synchronization control unit software. In the VoIP process of CPU 14, bidirectional audio data which is transmitted and received in a wireless manner to and from IP-DECT client terminal 7 is converted into a VoIP packet. TCP-IP and MAC of CPU 14 and Ethernet PHY of Ethernet PHY-LSI 11 are layers for transmitting and receiving a VoIP packet to and from other VoIP apparatuses via Ethernet (registered trademark).

The synchronization control unit hardware of Ethernet PHY-LSI 11 is a hardware accelerator conforming to IEEE 1588 Ver. 2, and has a hardware function for synchronizing time information and the clock rate of TimeStamp (time stamp) thereof with a timing master by using an IEEE 1588 Ver. 2 protocol.

The synchronization control unit software of CPU 14 is software for realizing synchronization using the IEEE 1588 Ver. 2 protocol by controlling the synchronization control unit hardware of Ethernet PHY-LSI 11. The synchronization control unit software has two modes including a master mode and a slave mode. In the present exemplary embodiment, a master mode is set in the synchronization control unit software of master station 6-1, and a slave mode is set in the synchronization control unit software of each of slave stations 6-2 and 6-3. Storage unit 12 is used to record network situation data for each of slave stations 6-2 and 6-3. State display unit 13 is used to display (LED) a diagnostic result.

Here, a description will be made of transmission and reception of a synchronization message between master station 6-1 and slave stations 6-2 and 6-3.

Figure 9:
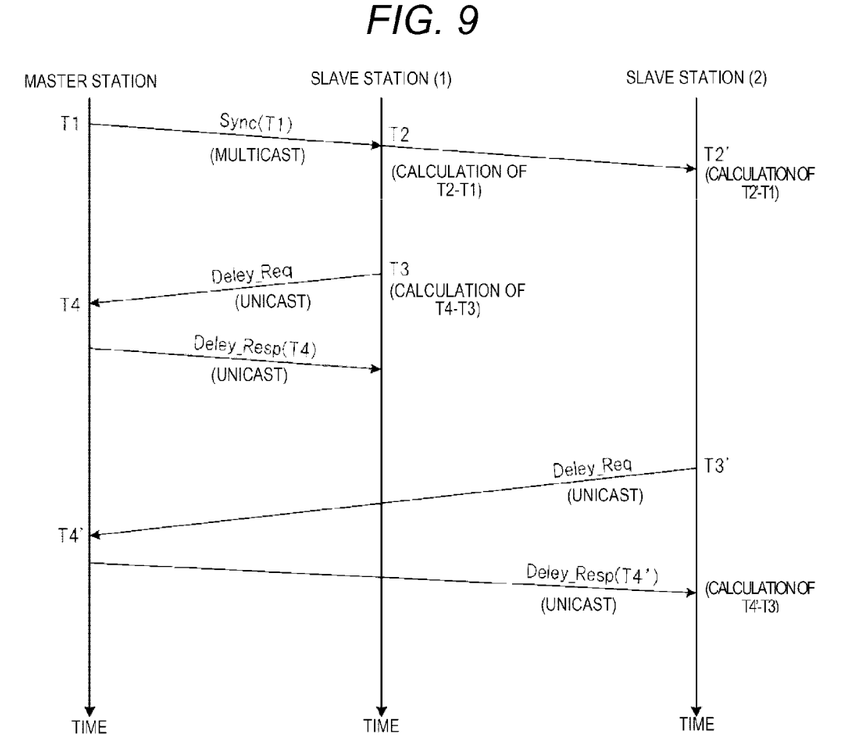
FIG. 9 is a sequence diagram illustrating transmission and reception of synchronization messages between a single master station and two slave stations.

FIG. 9 is a sequence diagram illustrating transmission and reception of a synchronization message between a single master station and two slave stations. The master station, and slave stations (1) and (2) are connected to each other via Ethernet (registered trademark). The master station of FIG. 9 corresponds to master station 6-1, slave station (1) of FIG. 9 corresponds to slave station 6-2, and slave station (2) corresponds to slave station 6-3.

First, the master station transmits Sync(T1) to slave stations (1) and (2) (transmission using multicast). If multicast Sync(T1) is received, slave station (1) calculates the difference (T2−T1) from a reception time point T2, and transmits a message such as Delay_Req to the master station at a time point T3 (transmission using unicast). If unicast Delay_Req is received from slave station (1), the master station transmits a message such as Delay_Resp(T4) including a reception time point T4 to slave station (1) (transmission using unicast). If unicast Delay_Resp(T4) is received, slave station (1) calculates the difference (T4−T3) between the transmission time point (T3) of Delay_Req and the reception time point (T4) of Delay_Req in the master station. In other words, a delay time of Delay_Req between the master station and slave station (1) is calculated.

In the same manner as in slave station (1), if multicast Sync(T1) is received, slave station (2) calculates the difference (T2'−T1) from a reception time point T2', and transmits a message such as Delay_Req to the master station at a time point T3' (transmission using unicast). If unicast Delay_Req is received from slave station (2), the master station transmits a message such as Delay_Resp(T4') including a reception time point T4' to slave station (2) (transmission using unicast). If unicast Delay_Resp(T4') is received, slave station (2) calculates the difference (T4'−T3') between the transmission time point (T3') of Delay_Req and the reception time point (T4') of Delay_Req in the master station. In other words, a delay time of Delay_Req between the master station and slave station (2) is calculated.

A processing load on the slave stations is related to only a process for the master station since Delay_Req and Delay_Resp are unicast. The master station is required to process Delay_Req and Delay_Resp of all slave stations, and thus there is a concern that the master station is short of resources (for example, insufficient capability of a central processing unit (CPU)) when Delay_Req and Delay_Resp are concentrated. The number of slave stations which can be accommodated in the synchronization system is determined depending on the resource capability of the master station. The above description relates to transmission and reception of a synchronization message between master station 6-1 and slave stations 6-2 and 6-3.

Figure 3:
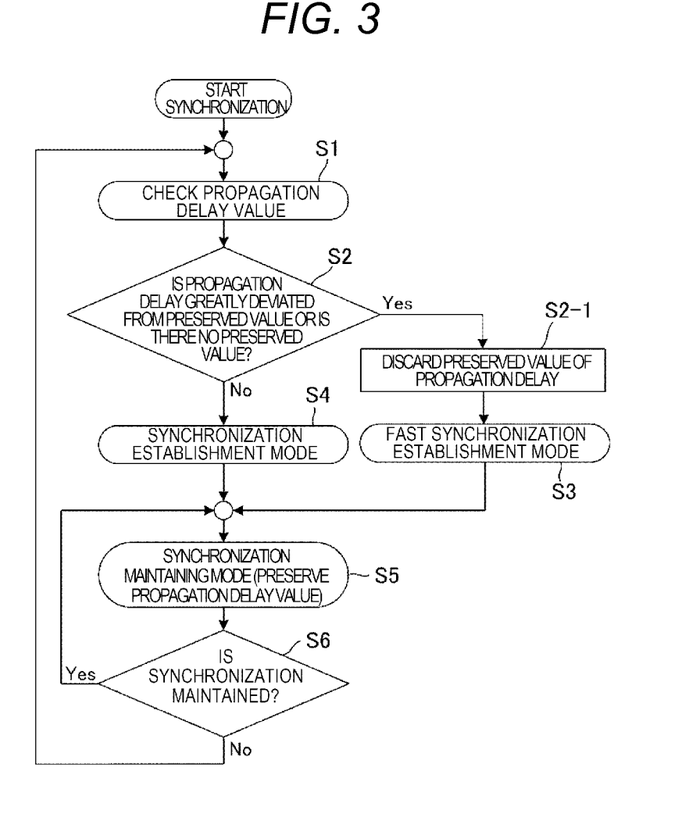
FIG. 3 is a flowchart illustrating a synchronization establishment process in the slave station of the communication system illustrated in FIG. 1.

FIG. 3 is a flowchart illustrating a synchronization establishment process in each of slave stations 6-2 and 6-3. Slave stations 6-2 and 6-3 perform the same synchronization establishment process, and thus slave station 6-2 will be described mainly. In FIG. 3, first CPU 14 of slave station 6-2 checks a propagation delay value (step S1). In other words, an average value of the delay time (T2−T1) of Sync and the delay time (T4−T3) of Delay_Req, illustrated in FIG. 9, is obtained, and a result thereof is set as the propagation delay value. In slave station 6-3, an average value of the delay time (T2'−T1) of Sync(T1) and the delay time (T4'−T3') of the Delay_Req and Delay_Resp (T4'), illustrated in FIG. 9, is obtained, and a result thereof is set as the propagation delay value.

CPU 14 of slave station 6-2 checks the propagation delay value and then determines whether or not the propagation delay value is greatly deviated from a preserved value, or whether or not the preserved value is present (step S2). In other words, it is determined whether or not a difference between the propagation delay value and the preserved value exceeds a predetermined value. In this case, the preserved value which is compared with the propagation delay value is, for example, a learning value, and is preserved in the synchronization control unit software of CPU 14 of slave station 6-2. If it is determined in step S2 that the propagation delay value is greatly deviated from the preserved value, including a case where the preserved value is not present (that is, a difference between the propagation delay value and the preserved value exceeds a predetermined threshold value (if "Yes" is determined)), CPU 14 of slave station 6-2 temporarily discards the preserved value of propagation delay (step S2-1), and enters a fast synchronization establishment mode for establishing synchronization at a high speed (step S3). In contrast, if it is determined that the propagation delay value is not greatly deviated from the preserved value (that is, a difference between the propagation delay value and the preserved value is equal to or smaller than the predetermined threshold value (if "No" is determined)), CPU 14 of slave station 6-2 enters a synchronization establishment mode for establishing synchronization at a normal speed (step S4).

After entering one of the synchronization establishment mode and the fast synchronization establishment mode, CPU 14 enters a synchronization maintaining mode and preserves the propagation delay value which is checked at this time (step S5). Next, it is determined whether or not the synchronization is maintained (step S6), and if the synchronization is maintained (if "Yes" is determined in step S6), the flow returns to step S5. In contrast, if the synchronization is not maintained (if "No" is determined in step S6), it is determined that the synchronization is canceled, and the flow returns to step Si where the propagation delay value is checked again, and the above-described processes are performed again.

A synchronization message in IEEE 1588 Ver. 2 has a cycle of one second in both synchronization maintenance and synchronization capture (this means that synchronization is performed for the first time). However, there is a standard for an option for exchanging messages in a short period of time in order to reduce a synchronization capture time. If a cycle shorter than one second is used in both synchronization maintenance and synchronization capture, this is effective in a case where a network environment is poor (for example, there is a lot of jitter).

In the present exemplary embodiment, the cycle of one second of the message is divided into 100 time slots including slot "0" to slot "99", and ten slots including slot "90" to slot "99" as some of the slots are allocated only to a fast synchronization establishment mode so as to be shared by all slave stations. Slave stations which require time to compensate for synchronization are caused to sequentially enter a fast synchronization establishment mode so that synchronization is established at a high speed.

Figure 4:
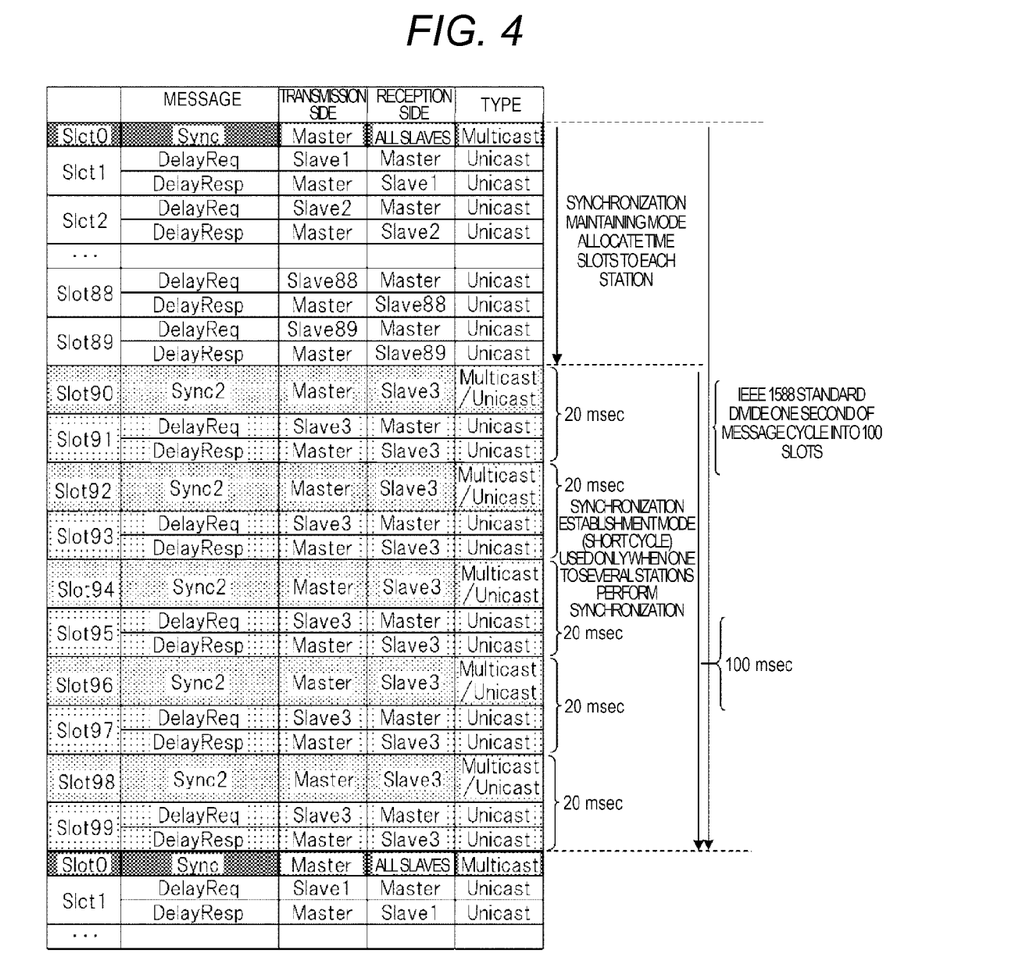
FIG. 4 is a diagram for explaining time slot control in a fast synchronization establishment mode of the communication system illustrated in FIG. 1.

FIG. 4 is a diagram for explaining time slot control in the fast synchronization establishment mode. FIG. 4 illustrates an example in which slave station 6-3 (Slave3) performs fast synchronization establishment. As described above, one second as a message cycle in the IEEE 1588 Ver. 2 standard is divided into 100 time slots, and the time slots are allocated to respective stations. In this case, in the synchronization establishment mode, slot "0" is allocated to a Sync message which is transmitted from master station 6-1 to all slave stations 6-2 to 6-89. Slot "1" is allocated to slave station 6-2, and is used for Delay_Req and Delay_Resp which are transmitted to and received from master station 6-1. Slot "2" is allocated to slave station 6-3, and is used for Delay_Req and Delay_Resp which are transmitted to and received from master station 6-1. Similarly, slot "88" is allocated to slave station 6-88, and slot "89" is allocated to slave station 6-89. FIG. 4 illustrates slave stations 6-4 to 6-89, but, in the present exemplary embodiment, slave stations 6-4 to 6-89 are not included.

On the other hand, in the fast synchronization establishment mode, one slave station to several slave stations are allocated with slots "90" to "99". Some time slots (slots "90" to "99") are shared by all the stations so as to be used only for the fast synchronization establishment mode. In FIG. 4, slave station 6-3 (Slave3) uses the fast synchronization establishment mode. The number of stations which enter the fast synchronization establishment mode at one time is one in order for all the stations to share some time slots, but several stations can enter the fast synchronization establishment mode as long as resources can be used. Since the number of target slave stations is restricted, Sync2 which is transmitted in a short cycle by master station 6-1 may be transmitted not by multicast but by unicast. In the fast synchronization establishment mode, a set of 20 msec periods (a message set of Sync2, Delay_Req, and Delay_Resp) is repeated five times.

Figure 5:
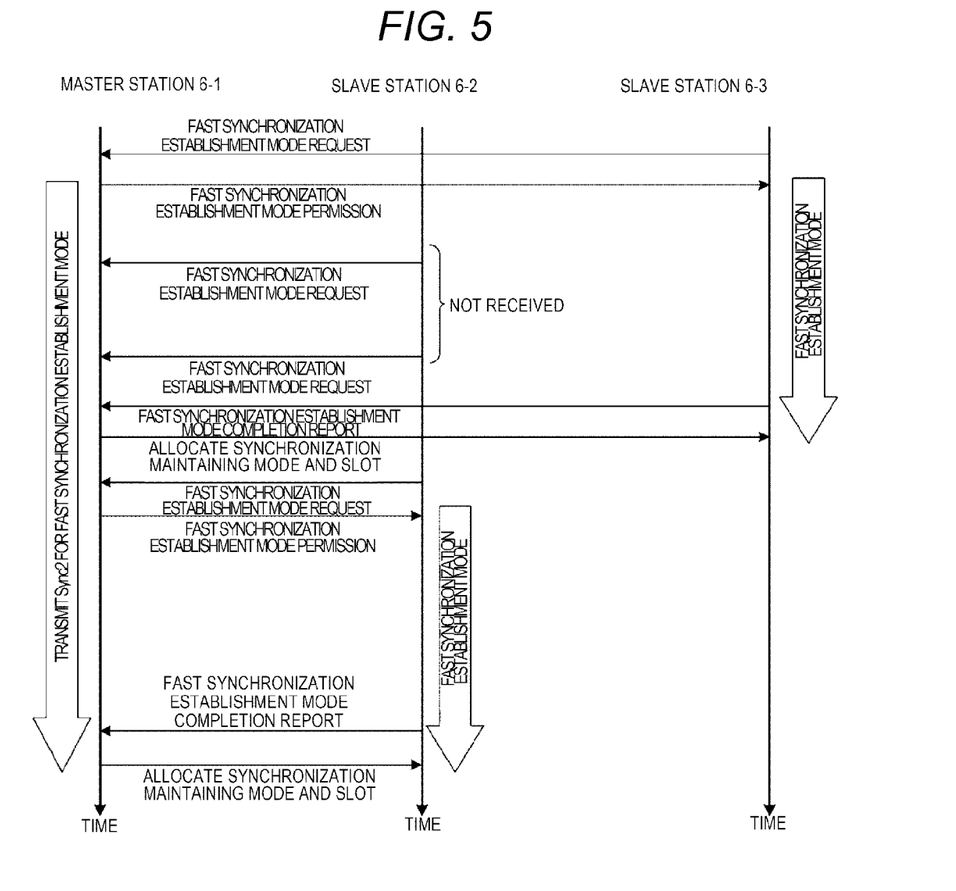
FIG. 5 is a sequence diagram illustrating an example of an operation of a request for and permission of the fast synchronization establishment mode between the master station and the slave stations of the communication system illustrated in FIG. 1.

FIG. 5 is a sequence diagram illustrating an example of an operation of a request for and permission of the fast synchronization establishment mode between master station 6-1 and slave stations 6-2 and 6-3. In FIG. 5, slave station 6-3 makes a request for the fast synchronization establishment mode and transmits a fast synchronization establishment mode request to master station 6-1, and master station 6-1 transmits fast synchronization establishment mode permission. If the fast synchronization establishment mode permission is received from master station 6-1, slave station 6-3 enters the fast synchronization establishment mode. When synchronization establishment has been completed, a fast synchronization establishment mode completion report is transmitted to master station 6-1. If the fast synchronization establishment mode completion report is received from slave station 6-3, master station 6-1 transmits a synchronization maintaining mode and slot allocation to slave station 6-3.

During the fast synchronization establishment mode in slave station 6-3, even if a fast synchronization establishment mode request is transmitted from slave station 6-2, this request is not received. After the fast synchronization establishment mode has been completed in slave station 6-3, and the synchronization establishment mode and slot allocation are transmitted from master station 6-1, if there is a fast synchronization establishment mode request from slave station 6-2, master station 6-1 permits the request. Consequently, slave station 6-2 establishes synchronization at a high speed.

As mentioned above, the slots only for use in the fast synchronization establishment mode are shared by all the stations, but the number of stations which can use the fast synchronization establishment mode at one time is restricted, and thus there is the utilization of a system in which a request message of the fast synchronization establishment mode and a permission message thereof are transmitted and received. The master station does not permit a request made when the allowable number of stations is exceeded, and causes a station which has made the request to wait until a vacant resource is generated. Sync2 for the fast synchronization establishment mode may be transmitted only during transmission of the fast synchronization establishment mode in order to save network resources.

Figure 6:
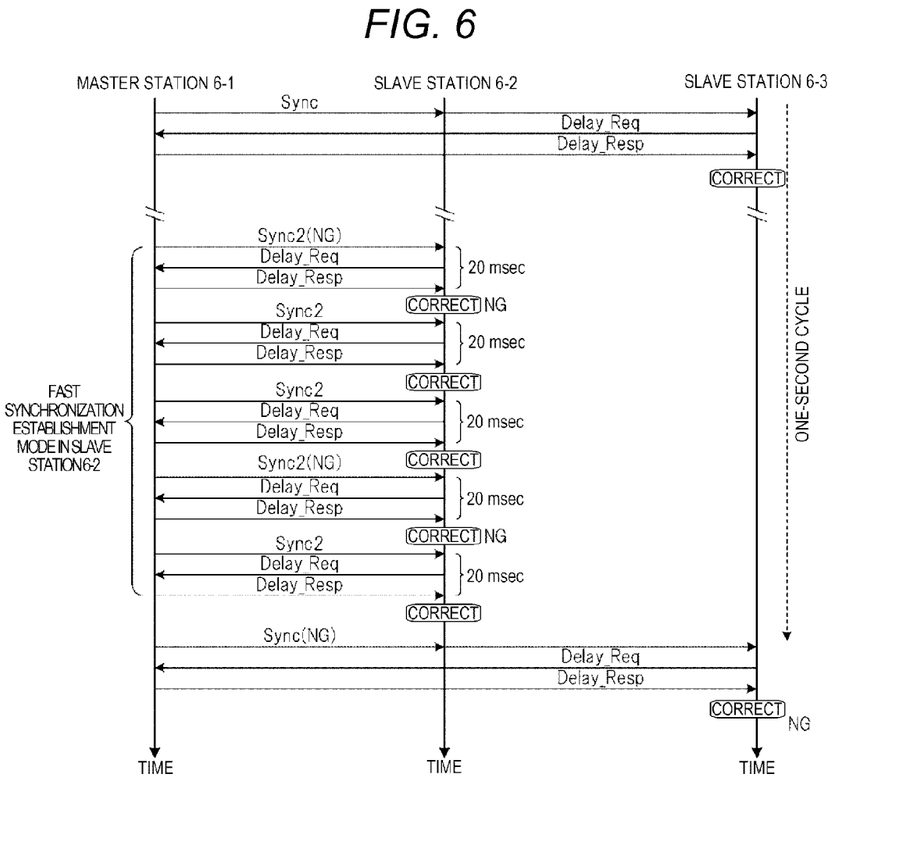
FIG. 6 is a sequence diagram illustrating the fast synchronization establishment mode in the slave station of the communication system illustrated in FIG. 1.

FIG. 6 is a sequence diagram illustrating a fast synchronization establishment mode in slave station 6-2. In a poor network environment, jitter occurs in the propagation time of a message for establishing synchronization, and thus normal correction cannot be performed for the most part. Particularly, if this situation occurs during synchronization establishment, settlement thereof requires a lot of time in normal synchronization establishment with a cycle of one second. In contrast, in the fast synchronization establishment, messages (Sync2, Delay_Req, and Delay_Resp) for establishing synchronization in a short cycle are exchanged between the master station and the slave stations in a short cycle, thus the correction frequency is increased, and, as a result, it is possible to reduce the settlement time.

In the fast synchronization establishment mode, a synchronization message set of Sync2, Delay_Req, and Delay_Resp with a short cycle is repeatedly transmitted and received in up to five sets every 20 msec, and correction is performed in each set, but even if there is a set in which correction cannot be performed (a set in which normal correction cannot be performed by a certain determination criterion), the correction can be performed in the subsequent sets without needing a cycle of one second which is required in the normal synchronization establishment. FIG. 6 illustrates an example in which normal correction is not performed in the first set and the fourth set, but the normal correction is performed in the second set and the fifth set without needing a cycle of one second. In a case where synchronization is not established and the normal correction cannot be performed (for example, in a case where there is, as a result, a failure in arrival of synchronization capture or synchronization is canceled during synchronization maintenance), CPU 14 of slave station 6-2 displays the fact on state display unit 13.

Figure 7:
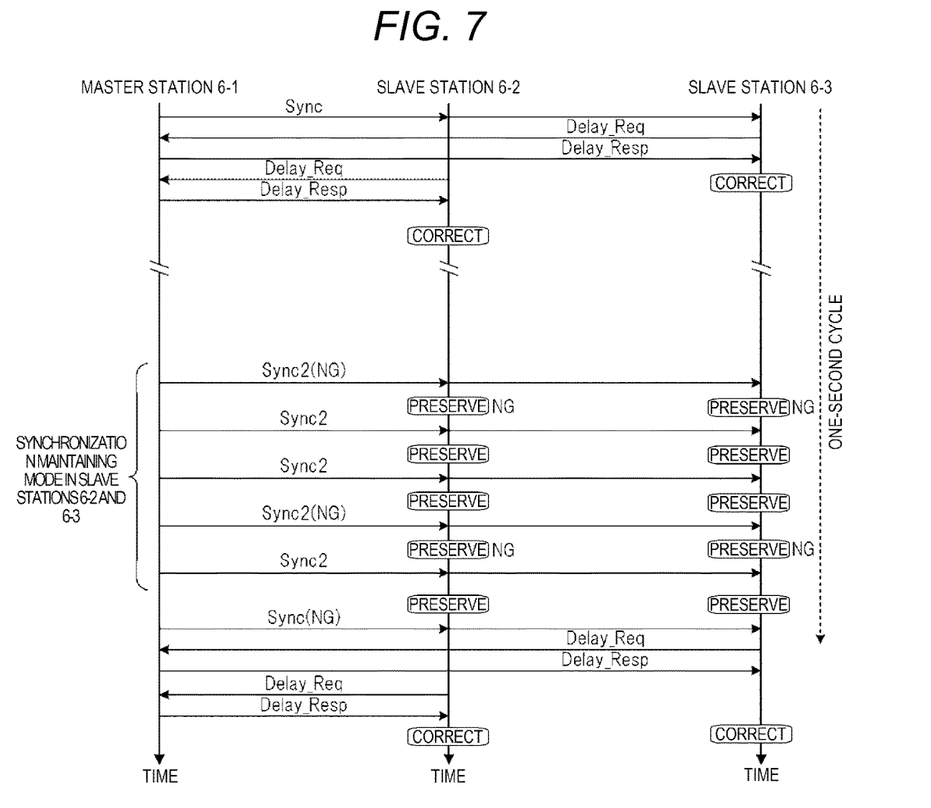
FIG. 7 is a sequence diagram illustrating a synchronization maintaining mode in the slave station of the communication system illustrated in FIG. 1.

FIG. 7 is a sequence diagram illustrating a synchronization maintaining mode in each of slave stations 6-2 and 6-3. The synchronization maintaining mode is executed after synchronization is established. In the synchronization maintaining mode, master station 6-1 transmits Sync2 with multicast in a short cycle, and each of slave stations 6-2 and 6-3 receives and preserves Sync2. In other words, slave station 6-2 preserves the (T2–T1), and slave station 6-3 preserves the (T2'–T1). Slave station 6-2 receives Sync2 of five sets, and then selects one which is the optimum for correction from the preserved difference (T2–T1), so as to correct a phase and a rate of a synchronization signal used thereby. Similarly, slave station 6-3 receives Sync2 of five sets, and then selects one which is the optimum for correction from the preserved difference (T2'–T1), so as to correct a phase and a rate of a synchronization signal used thereby. A Sync message with a short cycle may be stopped in a case where there is no fast synchronization pull-in mode (in order to save network resources).

As mentioned above, according to communication system 1 in the present exemplary embodiment, a one-second cycle of a message is divided into 100 time slots including slot "0" to slot "99"; ten slots including slot "90" to slot "99" as some of the slots are allocated to a fast synchronization establishment mode; and, in the fast synchronization establishment mode, messages such as Sync2, Delay_Req, and Delay_Resp are transmitted and received between master station 6-1 and slave stations 6-2 and 6-3 so that slave stations 6-2 and 6-3 establish synchronization. Therefore, it is possible to reduce the time required to establish synchronization in slave stations 6-2 and 6-3 without putting an unnecessary load on master station 6-1.

A request for and permission of the fast synchronization establishment mode are performed by using a message system as follows. That is, before entering the fast synchronization establishment mode, slave stations 6-2 and 6-3 transmit a fast synchronization establishment mode request to master station 6-1, and master station 6-1 transmits fast synchronization establishment mode permission to slave stations 6-2 and 6-3 in response to the fast synchronization establishment mode request. Therefore, in a case where there is a request made when an allowable number of stations (allowable number of slave stations) is exceeded, master station 6-1 does not permit the request, and thus it is possible to minimize an unnecessary load on master station 6-1.

In the fast synchronization establishment mode, every time a predetermined message is transmitted and received between master station 6-1 and slave stations 6-2 and 6-3, slave stations 6-2 and 6-3 correct a phase and a rate of a synchronization signal used by slave stations 6-2 and 6-3, and thus normal correction can be performed even within a poor network environment.

Modification Example of Present Exemplary Embodiment

Figure 8:
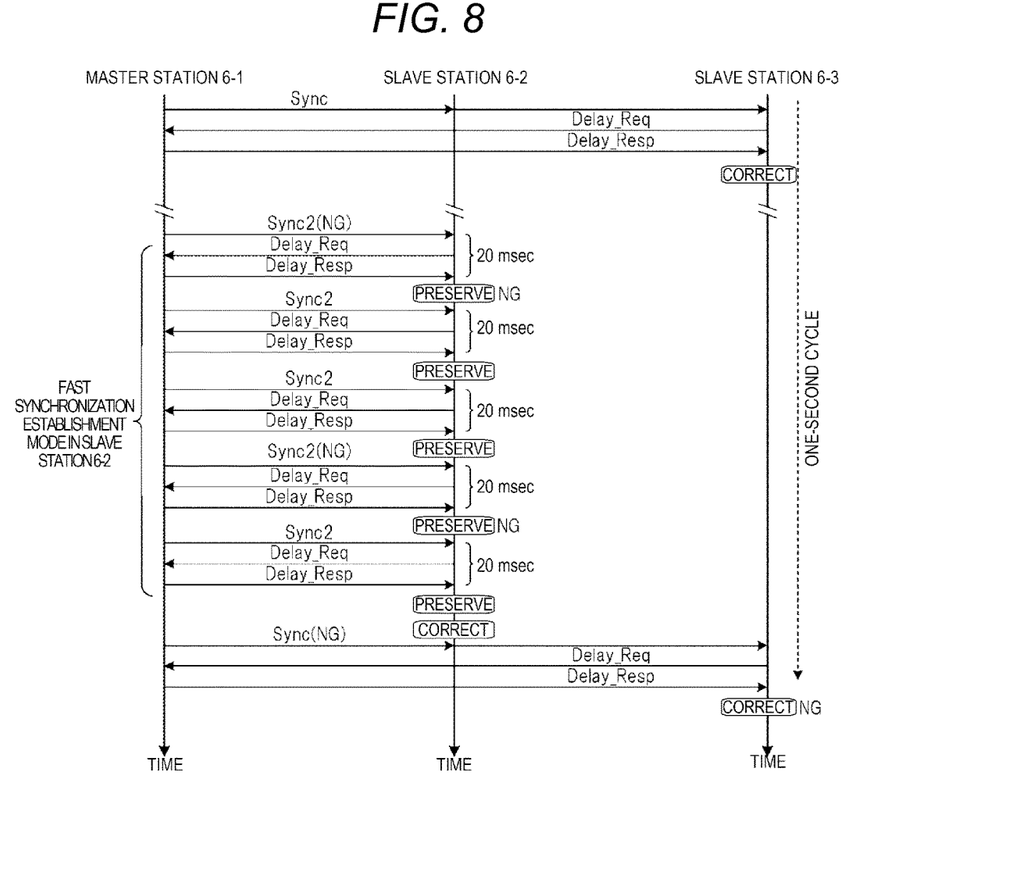
FIG. 8 is a sequence diagram illustrating a modification example of the fast synchronization establishment mode in the slave station of the communication system illustrated in FIG. 1.

FIG. 8 is a sequence diagram illustrating a modification example of the fast synchronization establishment mode in slave station 6-2. In the above-described fast synchronization establishment mode illustrated in FIG. 6, a synchronization message set of Sync2, Delay_Req, and Delay_Resp with a short cycle is repeatedly transmitted and received up to five sets every 20 msec, and correction is performed in each set, but, in the present modification example, the difference (T2–T1) and the difference (T4–T3) are preserved for each of five sets, one of which is the optimum for correction is selected from the preserved differences (T2–T1) and the differences (T4–T3) of the five sets, so as to perform the correction. As a method of selecting the optimum value, for example, there is a method of using the minimum value of the differences (T2–T1) and the differences (T4–T3).

As mentioned above, in the fast synchronization establishment mode, every time a predetermined message is transmitted and received between master station 6-1 and slave stations 6-2 and 6-3, slave stations 6-2 and 6-3 preserve a measurement result of delay time, and a phase and a rate of a synchronization signal used by slave stations 6-2 and 6-3 are corrected by using the optimum value among the measurement results. Therefore, normal correction can be performed even within a poor network environment, and the correction is completed at one time. Thus, it is possible to reduce a synchronization correction processing load.

What is claimed is:

1. A synchronization establishment method of performing synchronization establishment between a master station and a slave station, among a plurality of slave stations, via a network, the method comprising:
dividing a message cycle into a plurality of time slots;
allocating less than all of the plurality of time slots for use in a fast synchronization establishment mode by the plurality of slave stations;
establishing wired connections between the master station and the plurality of slave stations, respectively;
the master station receiving from the slave station, over one of the wired connections, a fast synchronization establishment mode request, and if a limited number of slave station(s) allowed to enter the fast synchronization establishment mode is not exceeded, transmitting to the slave station over the wired connection a fast synchronization establishment mode permission; and
performing synchronization establishment by transmitting and receiving synchronization messages between the master station and the slave station over the wired connection using the allocated time slots in the fast synchronization establishment mode,
wherein the master station does not transmit to the slave station the fast synchronization establishment mode permission if the limited number of slave station(s) allowed to enter the fast synchronization mode is exceeded.

2. The synchronization establishment method of claim 1, wherein, in the fast synchronization establishment mode a phase and a rate of a clock used by the slave station are corrected.

3. The synchronization establishment method of claim 1, wherein, in the fast synchronization establishment mode, every time the synchronization messages are transmitted and received between the master station and the slave station, the slave station stores a measurement result of delay time, and a phase and a frequency of a synchronization signal used by the slave station are corrected by using an optimum value among the measurement results.

4. The synchronization establishment method of claim 3, wherein the optimum value is a minimum value.

5. The synchronization establishment method of claim 1, wherein, in a case where a propagation delay value is greatly deviated from a threshold value, the slave station transmits the fast synchronization establishment mode request to the master station.

6. The synchronization establishment method of claim 1, which is in compliance with the IEEE 1588 standard.

7. The synchronization establishment method of claim 6, wherein the synchronization messages include a sync message, a Delay_Response message, and a Delay_Request message.

8. A communication system comprising:
a master station including:
first processing circuitry which, in operation, divides a message cycle into a plurality of time slots, and allocates less than all of the plurality of time slots for use in a fast synchronization establishment mode by a plurality of slave stations to which the master station is coupled via wired connections, respectively; and
first communication circuitry which, in operation, receives from one of the slave stations over one of the wired connection a fast synchronization establishment mode request, and if a limited number of slave station(s) allowed to enter the fast synchronization establishment mode is not exceeded as determined by the first processing circuitry, transmits to the slave station over the wired connection a fast synchronization establishment mode permission; and
the plurality of slave stations, each including:
second transmission circuitry which , in operation, transmits over the wired connection to the master station the fast synchronization establishment mode request and receives over the wired connection from the master station the fast synchronization establishment mode permission; and
second processing circuitry which, in operation, performs synchronization establishment with the master station by controlling the second transmission circuitry to transmit and receive synchronization messages over the wired connection to and from the master station using the allocated time slots in the fast synchronization establishment mode.

9. The communication system of claim 8, wherein the second processing circuitry of the slave station that has entered the fast synchronization establishment mode, in operation, corrects a phase and a rate of a clock used by the slave station.

10. The communication system of claim 8, wherein, every time the synchronization messages are transmitted and received between the master station and the slave station in the fast synchronization establishment mode, the second processing circuitry of the slave station stores a measurement result of delay time, and corrects a phase and a frequency of a synchronization signal using an optimum value among the measurement results.

11. The communication system of claim 10, wherein the optimum value is a minimum value.

12. The communication system of claim 8, wherein, in a case where a propagation delay value is greatly deviated from a threshold value, the slave station transmits the fast synchronization establishment mode request to the master station.

13. The synchronization system of claim 8, which is in compliance with the IEEE 1588 standard.

14. The synchronization system of claim 13, wherein the synchronization messages include a sync message, a Delay_Response message, and a Delay_Request message.

* * * * *